United States Patent
Kang et al.

(10) Patent No.: US 9,712,222 B2
(45) Date of Patent: Jul. 18, 2017

(54) LAYER ALIGNMENT METHOD AND APPARATUS FOR MULTILAYER THREE-DIMENSIONAL BEAMFORMING IN WIRELESS COMMUNICATION SYSTEM

(71) Applicant: LG ELECTRONICS INC., Seoul (KR)

(72) Inventors: Jiwon Kang, Seoul (KR); Kilbom Lee, Seoul (KR); Hyunsoo Ko, Seoul (KR); Jaehoon Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 66 days.

(21) Appl. No.: 14/779,183

(22) PCT Filed: Jan. 29, 2014

(86) PCT No.: PCT/KR2014/000845
§ 371 (c)(1),
(2) Date: Sep. 22, 2015

(87) PCT Pub. No.: WO2014/168323
PCT Pub. Date: Oct. 16, 2014

(65) Prior Publication Data
US 2016/0056875 A1  Feb. 25, 2016

Related U.S. Application Data

(60) Provisional application No. 61/810,271, filed on Apr. 10, 2013.

(51) Int. Cl.
*H04W 4/00* (2009.01)
*H04B 7/06* (2006.01)
(Continued)

(52) U.S. Cl.
CPC ......... *H04B 7/0617* (2013.01); *H04B 7/0456* (2013.01); *H04B 7/0469* (2013.01);
(Continued)

(58) Field of Classification Search
CPC .. H04B 7/0456; H04B 7/0469; H04B 7/0617; H04B 7/0619; H04B 7/0639; H04B 7/0691
See application file for complete search history.

(56) References Cited

U.S. PATENT DOCUMENTS

2009/0323840 A1  12/2009  Lee et al.
2010/0067605 A1   3/2010  Jongren
(Continued)

FOREIGN PATENT DOCUMENTS

JP    2010-526476 A      7/2010
KR  10-2010-0019970 A    2/2010
(Continued)

OTHER PUBLICATIONS

Alcatel-Lucent Shanghai Bell et al., "Considerations on CSI Feedback Enhancements for High-priority Antenna Configurations," 3GPP TSG-RAN WG1 #66, R1-112420, Athens, Greece, Aug. 22-26, 2011 (EPO Server date Aug. 18, 2011), 7 pages, XP050537814.

*Primary Examiner* — Kevin Mew
(74) *Attorney, Agent, or Firm* — Birch, Stewart, Kolasch & Birch, LLP

(57) ABSTRACT

A method for transmitting feedback information for fractional beamforming using a massive antenna array from a User Equipment (UE) to a Base Station (BS) in a wireless communication system is disclosed. The method includes receiving information about a plurality of Reference Signal (RS) resources from the BS; selecting at least one of a sub-precoder for at least one RS resources, and one linking precoder for linking the RS resources, based on a preset codebook; and reporting information about the selected precoder to the BS. The selected precoder is one precoding matrix of precoding matrices included in the codebook or a permuted form of the one precoding matrix, and the infor- (Continued)

mation about the selected precoder includes an index and permutation information of the one precoding matrix.

12 Claims, 16 Drawing Sheets

(51) Int. Cl.
*H04B 7/0456* (2017.01)
*H04B 7/04* (2017.01)

(52) U.S. Cl.
CPC ......... *H04B 7/0619* (2013.01); *H04B 7/0639* (2013.01); *H04B 7/0691* (2013.01)

(56) References Cited

U.S. PATENT DOCUMENTS

| | | | |
|---|---|---|---|
| 2011/0085618 A1 | 4/2011 | Zhuang et al. | |
| 2011/0134902 A1 | 6/2011 | Ko et al. | |
| 2011/0205930 A1 | 8/2011 | Rahman et al. | |
| 2011/0249613 A1 | 10/2011 | Sun et al. | |
| 2013/0016604 A1* | 1/2013 | Ko | H04B 7/0404 370/216 |
| 2013/0121276 A1* | 5/2013 | Kim | H04W 72/0406 370/329 |
| 2013/0242764 A1* | 9/2013 | Maattanen | H04B 7/024 370/252 |
| 2013/0242773 A1* | 9/2013 | Wernersson | H04B 7/024 370/252 |
| 2013/0250876 A1* | 9/2013 | Hugl | H04W 24/10 370/329 |
| 2013/0286866 A1* | 10/2013 | Hammarwall | H04B 7/024 370/252 |
| 2013/0301432 A1* | 11/2013 | Hammarwall | H04B 7/0619 370/252 |
| 2013/0303090 A1* | 11/2013 | Hammarwall | H04B 7/0456 455/67.13 |
| 2014/0016714 A1* | 1/2014 | Chen | H04B 7/024 375/260 |
| 2014/0064109 A1* | 3/2014 | Krishnamurthy | H04J 11/0053 370/252 |
| 2014/0086285 A1* | 3/2014 | Yang | H04B 7/0691 375/219 |
| 2014/0169415 A1* | 6/2014 | Werner | H04B 7/0456 375/219 |
| 2014/0177745 A1* | 6/2014 | Krishnamurthy | H04B 7/0413 375/267 |
| 2015/0341099 A1* | 11/2015 | Kang | H04B 7/0626 375/267 |
| 2016/0087708 A1* | 3/2016 | Kang | H04B 7/0619 370/312 |
| 2016/0142115 A1* | 5/2016 | Onggosanusi | H04B 7/0456 370/252 |
| 2016/0149680 A1* | 5/2016 | Kang | H04B 7/0417 370/329 |

FOREIGN PATENT DOCUMENTS

| | | |
|---|---|---|
| WO | 2008/086239 A1 | 7/2008 |
| WO | WO 2011/163588 A2 | 12/2011 |

* cited by examiner

FIG. 2
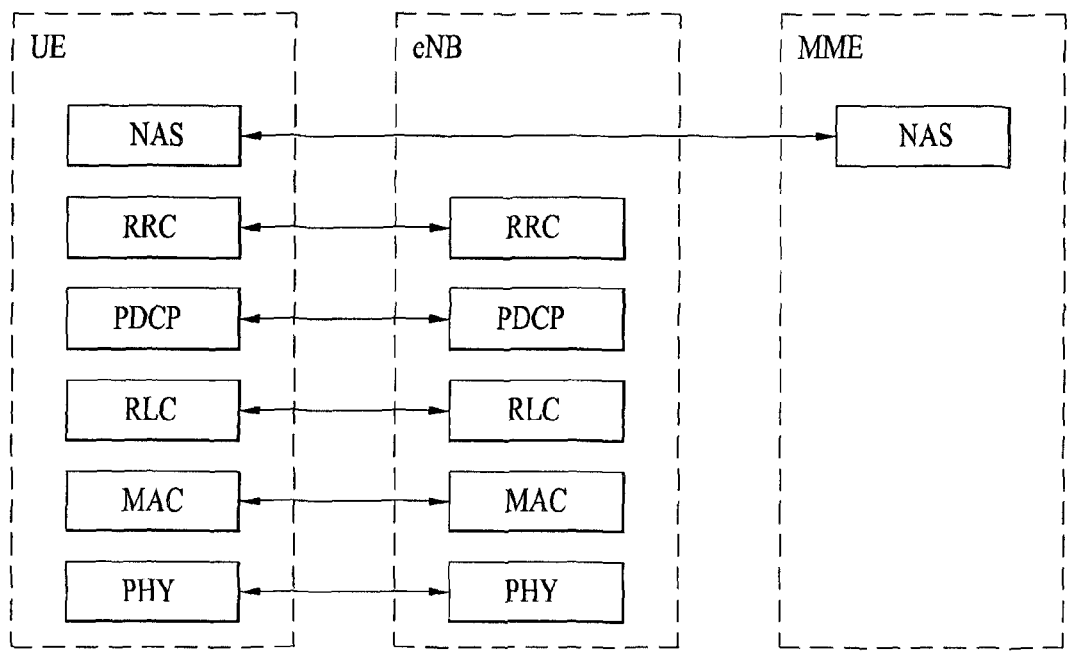
(A) CONTROL-PLANE PROTOCOL STACK
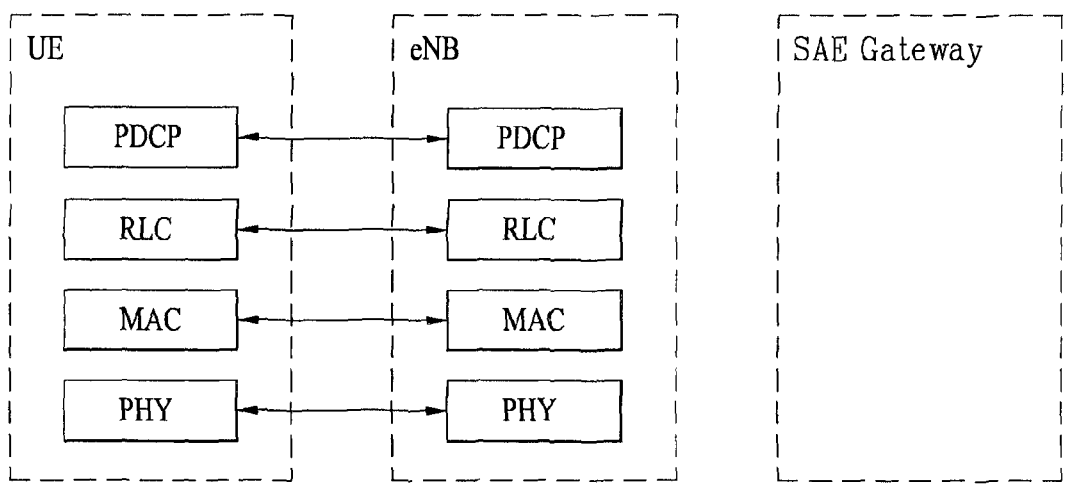
(B) USER-PLANE PROTOCOL STACK

☒ : DMRS GROUP 1

☒ : DMRS GROUP 2

(a) CONVENTIONAL ANTENNA SYSTEM  (b) AAS

LAYER ALIGNMENT METHOD AND APPARATUS FOR MULTILAYER THREE-DIMENSIONAL BEAMFORMING IN WIRELESS COMMUNICATION SYSTEM

CROSS REFERENCE TO RELATED APPLICATIONS

This application is the National Phase of PCT/KR2014/000845 filed on Jan. 29, 2014, which claims priority under 35 U.S.C. 119(e) to U.S. Provisional Application No. 61/810,271 filed on Apr. 10, 2013, all of which are hereby expressly incorporated by reference into the present application.

TECHNICAL FIELD

The present invention relates to a wireless communication system, and more particularly, to a layer alignment method and apparatus for multilayer Three-Dimensional (3D) beamforming in a wireless communication system.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the problem lies in a layer alignment method and apparatus for multilayer Three-Dimensional (3D) beamforming in a wireless communication system.

Technical Solution

The object of the present invention can be achieved by providing a method for transmitting feedback information for fractional beamforming using a massive antenna array from a User Equipment (UE) to a Base Station (BS) in a wireless communication system, the method including receiving information about a plurality of Reference Signal (RS) resources from the BS, selecting at least one of a sub-precoder for at least one RS resources, and one linking precoder for linking the RS resources, based on a preset codebook, and reporting information about the selected precoder to the BS, wherein the selected precoder is one precoding matrix of precoding matrices included in the codebook or a permuted form of the one precoding matrix, and wherein the information about the selected precoder includes an index and permutation information of the one precoding matrix.

In another aspect of the present invention, provided herein is a reception apparatus in a wireless communication system, the apparatus including a wireless communication module for receiving information about a plurality of Reference Signal (RS) resources from a transmission apparatus for fractional beamforming using a massive antenna array, and reporting information about a selected precoder to the transmission apparatus using the RS resources, and a processor for selecting at least one of a sub-precoder for at least one RS resources, and one linking precoder for linking the RS resources, based on a preset codebook, wherein the selected precoder is one precoding matrix of precoding matrices included in the codebook or a permuted form of the one precoding matrix, and wherein the information about the selected precoder includes an index and permutation information of the one precoding matrix.

If the RS resources respectively correspond to columns of the massive antenna array, the sub-precoder may be used for vertical beamforming and the linking precoder may be used for horizontal beamforming. Alternatively, if the RS resources respectively correspond to rows of the massive antenna array, the sub-precoder may be used for horizontal beamforming and the linking precoder may be used for vertical beamforming.

The permutation information may be permutation matrix information for defining a precoding matrix permuted from the one precoding matrix. In addition, the information about the selected precoder may include matching information between the sub-precoder and the linking precoder.

The massive antenna array may be partitioned in units of rows or columns, and the RS resources may correspond to the partitions.

Advantageous Effects

According to embodiments of the present invention, Three-Dimensional (3D) beamforming using large-scale Multiple Input Multiple Output (MIMO) in a wireless communication system may be efficiently performed.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN);

BEST MODE

Figure 1:
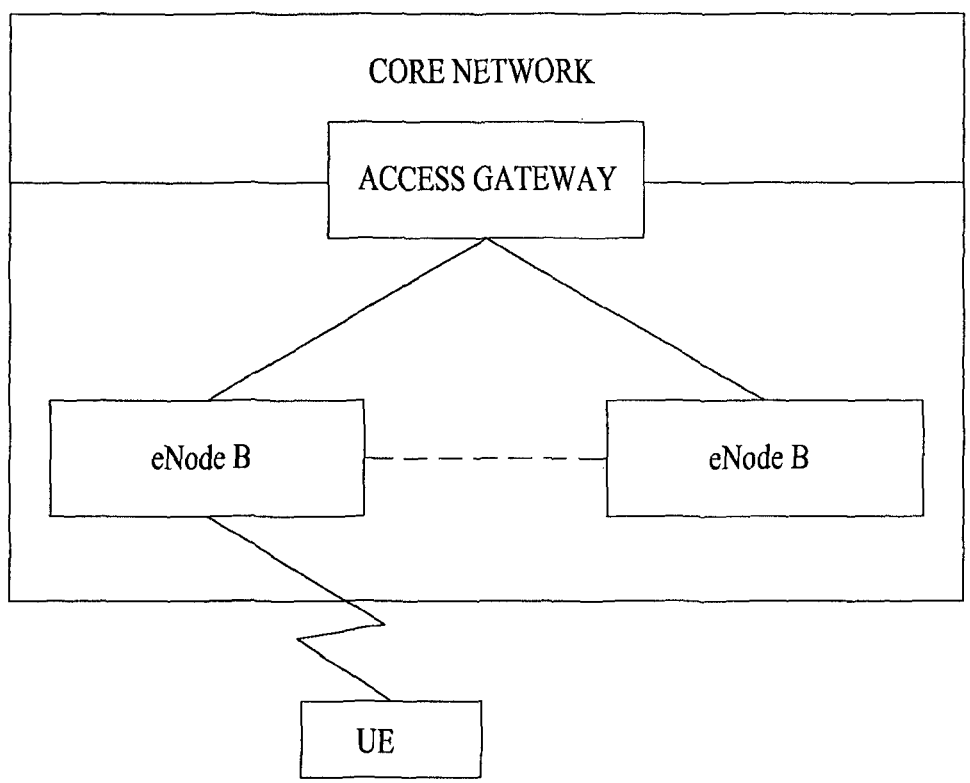
FIG. 1 illustrates a configuration of an Evolved Universal Mobile Telecommunications System (E-UMTS) network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
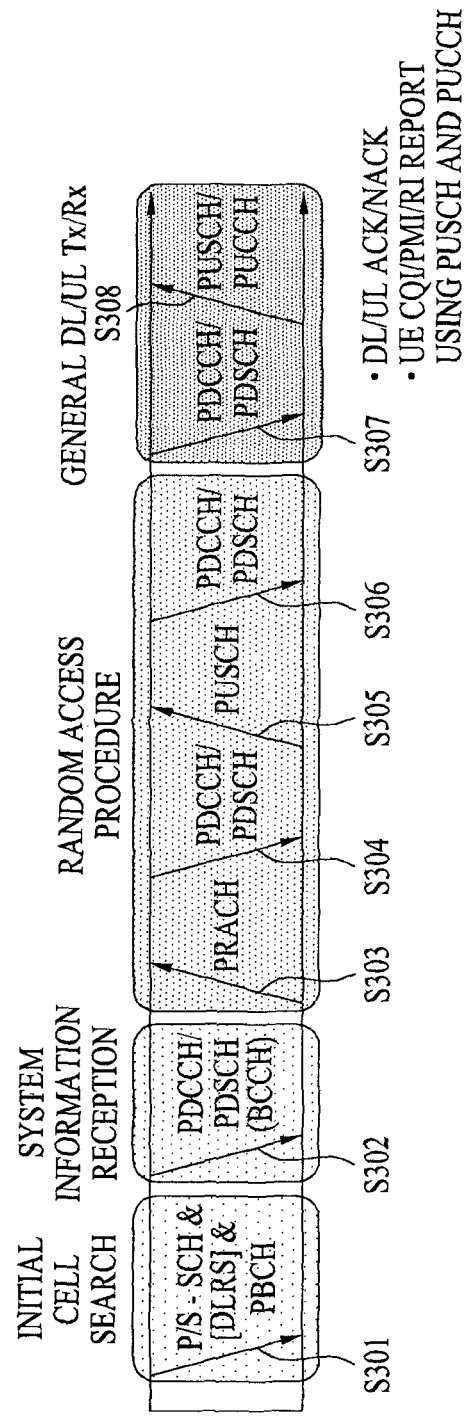
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
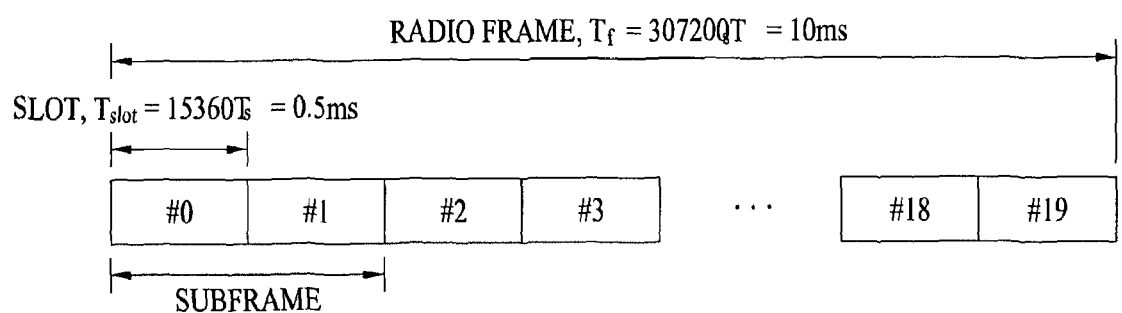
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
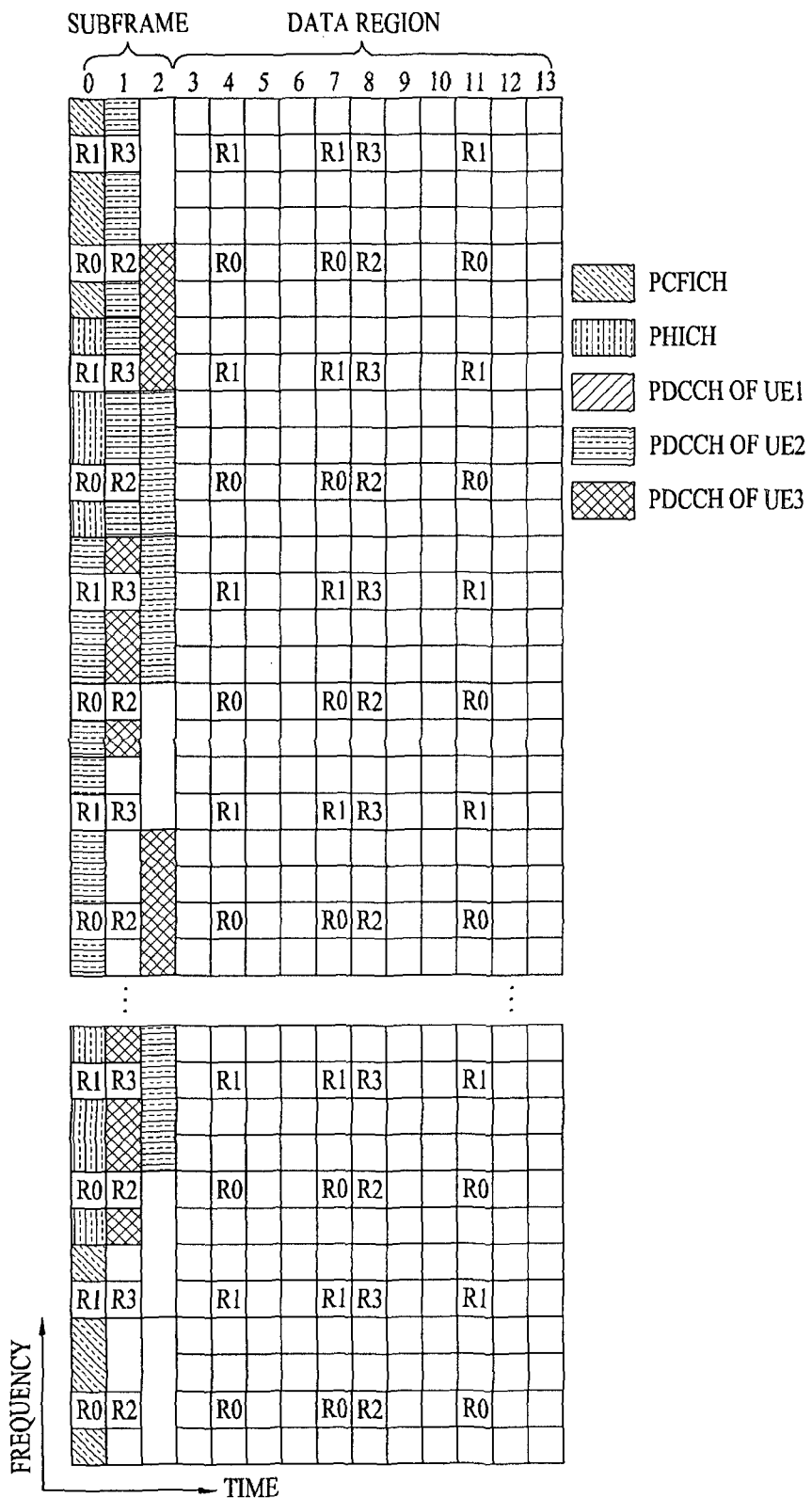
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
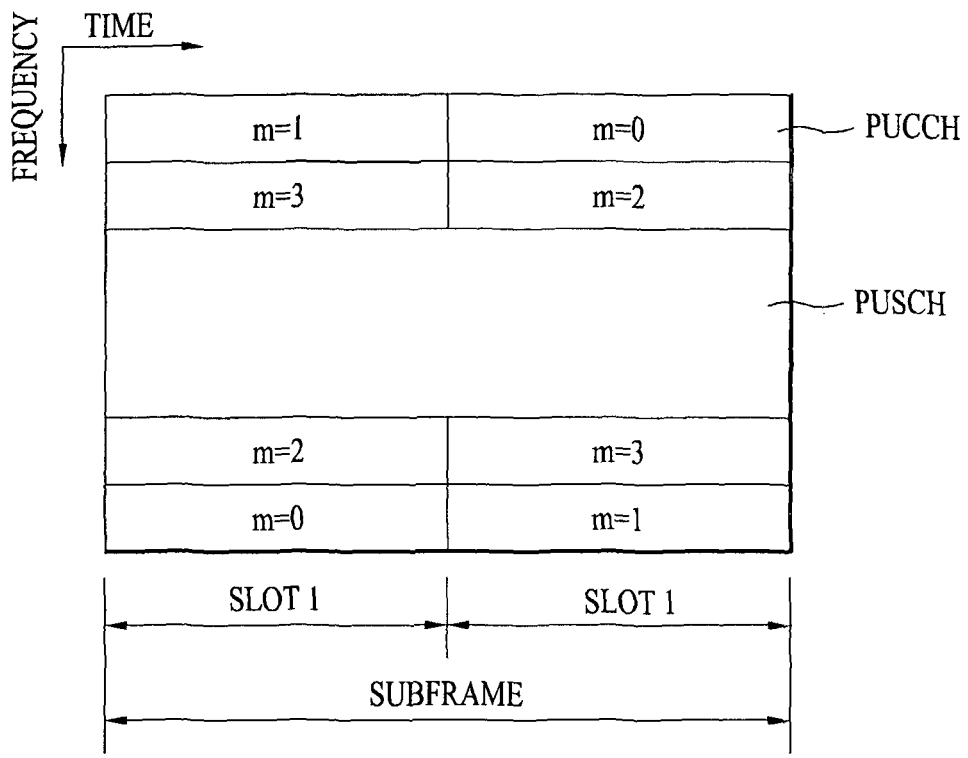
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Now a description will be given of a MIMO system. MIMO can increase the transmission and reception efficiency of data by using a plurality of Transmission (Tx) antennas and a plurality of Reception (Rx) antennas. That is, with the use of multiple antennas at a transmitter or a receiver, MIMO can increase capacity and improve performance in a wireless communication system. The term "MIMO" is interchangeable with 'multi-antenna'.

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 7:
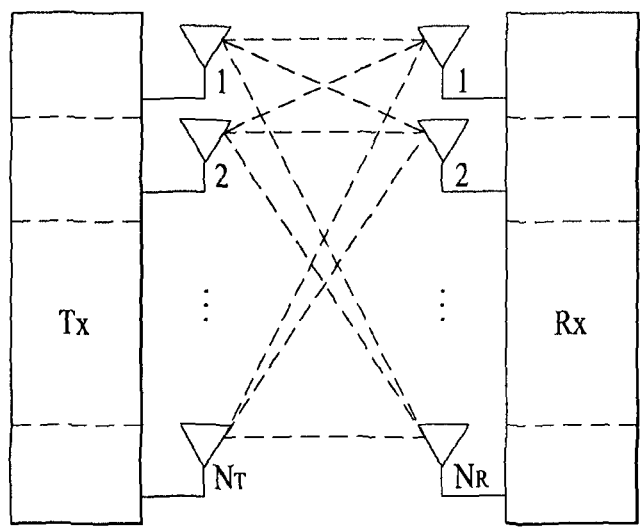
FIG. 7 illustrates a configuration of a general Multiple Input Multiple Output (MIMO) communication system.

FIG. 7 illustrates the configuration of a typical MIMO communication system. Referring to FIG. 7, a transmitter has $N_T$ Tx antennas and a receiver has $N_R$ Rx antennas. The use of a plurality of antennas at both the transmitter and the receiver increases a theoretical channel transmission capacity, compared to the use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R)$$ [Equation 1]

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards such as standards for 3G mobile communications, future-generation Wireless Local Area Network (WLAN), etc.

Concerning the research trend of MIMO up to now, active studies are underway in many aspects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas as illustrated in FIG. 7 will be described in detail through mathematical modeling. Regarding a transmission signal, up to $N_T$ pieces of information can be transmitted through the $N_T$ Tx antennas, as expressed as the following vector.

$$s = [s_1, s_2, \ldots, s_{N_T}]^T$$ [Equation 2]

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T$$ [Equation 3]

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$ [Equation 4]

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by [Equation 5]. Herein, $w_{ij}$ denotes a weight between a $j^{th}$ piece of information and an $i^{th}$ Tx antenna and W is referred to as a weight matrix or a precoding matrix.

$$x = \begin{bmatrix} x_1 \\ x_2 \\ \vdots \\ x_i \\ x_{N_T} \end{bmatrix} = \begin{bmatrix} w_{11} & w_{12} & \cdots & w_{1N_t} \\ w_{21} & w_{22} & \cdots & w_{2N_t} \\ \vdots & & \ddots & \vdots \\ w_{i1} & w_{i2} & \cdots & w_{iN_t} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$ [Equation 5]

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R)$$ [Equation 6]

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R)$$ [Equation 7]

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams are transmitted through a plurality of antennas, this may be spatial multiplexing. Needless to say, a hybrid scheme of spatial diversity and spatial multiplexing in combination may be contemplated.

It is expected that the future-generation mobile communication standard, LTE-A will support Coordinated Multi-Point (CoMP) transmission in order to increase data rate, compared to the legacy LTE standard. CoMP refers to transmission of data to a UE through cooperation from two or more eNBs or cells in order to increase communication performance between a UE located in a shadowing area and an eNB (a cell or sector).

CoMP transmission schemes may be classified into CoMP-Joint Processing (CoMP-JP) called cooperative MIMO characterized by data sharing, and CoMP-Coordinated Scheduling/Beamforming (CoMP-CS/CB).

In DL CoMP-JP, a UE may instantaneously receive data simultaneously from eNBs that perform CoMP transmission and may combine the received signals, thereby increasing reception performance (Joint Transmission (JT)). In addition, one of the eNBs participating in the CoMP transmission may transmit data to the UE at a specific time point (Dynamic Point Selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (Joint Reception (JR)). In contrast, in UL CoMP-CS/CB, only one eNB receives a PUSCH from a UE. Herein, cooperative cells (or eNBs) may make a decision as to whether to use CoMP-CS/CB.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 8:
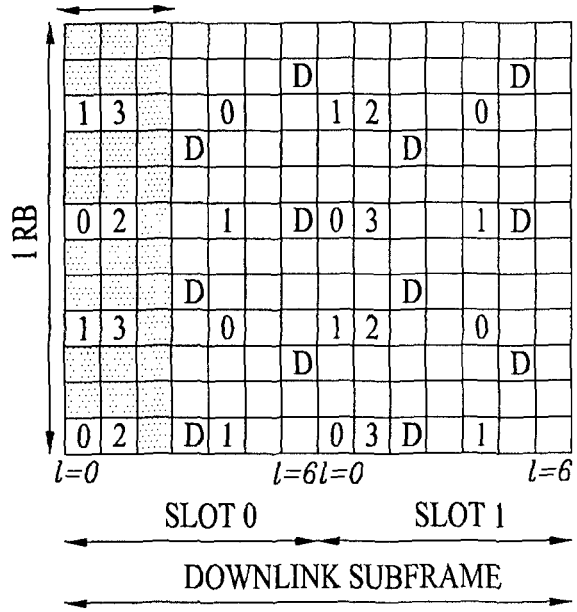
FIGS. 8 and 9 illustrate downlink Reference Signal (RS) configurations in an LTE system supporting downlink transmission through four antennas (4-Tx downlink transmission)
Figure 9:
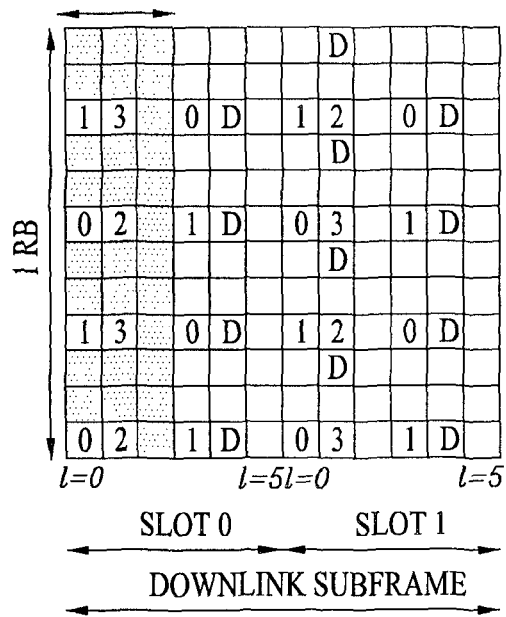

FIGS. 8 and 9 illustrate RS configurations in an LTE system supporting DL transmission through four antennas (4-Tx DL transmission). Specifically, FIG. 8 illustrates an RS configuration in the case of a normal CP and FIG. 9 illustrates an RS configuration in the case of an extended CP.

Referring to FIGS. 8 and 9, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 8 and 9, the DMRSs are transmitted through antenna port 5. 3GPP TS 36.211 defines DMRSs for a total of eight antenna ports, antenna port 7 to antenna port 14.

Figure 10:
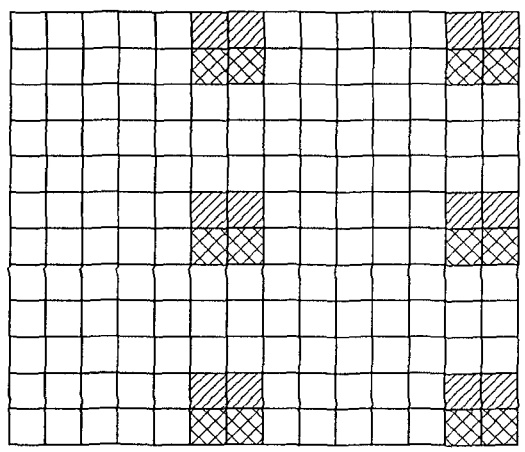
FIG. 10 illustrates an exemplary downlink Demodulation Reference Signal (DMRS) allocation defined in a current 3GPP standard specification.

FIG. 10 illustrates an exemplary DL DMRS allocation defined in a current 3GPP standard specification.

Referring to FIG. 10, DMRSs for antenna ports 7, 8, 11, and 13 are mapped using sequences for the respective antenna ports in a first DMRS group (DMRS Group 1), whereas DMRSs for antenna ports 9, 10, 12, and 14 are mapped using sequences for the respective antenna ports in a second DMRS group (DMRS Group 2).

As compared to CRS, CSI-RS was proposed for channel measurement of a PDSCH and up to 32 different resource configurations are available for CSI-RS to reduce Inter-Cell Interference (ICI) in a multi-cellular environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. [Table 1] and [Table 2] list CSI-RS configurations defined in the 3GPP standard. Specifically, [Table 1] lists CSI-RS configurations in the case of a normal CP and [Table 2] lists CSI-RS configurations in the case of an extended CP.

TABLE 1

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |

TABLE 2-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 26 | (1, 1) | 1 | | | | |
| 27 | (0, 1) | 1 | | | | |

Figure 11:
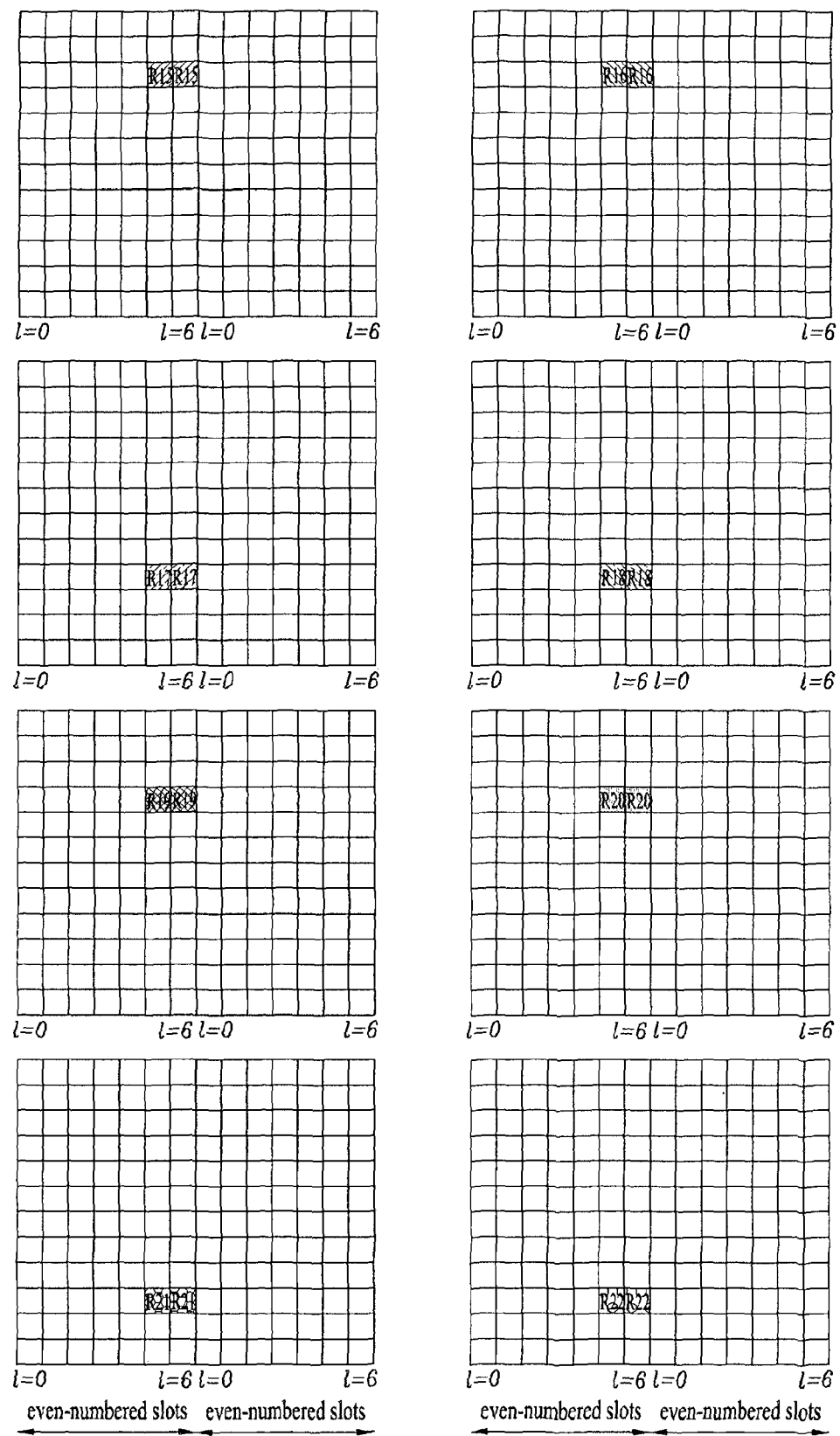
FIG. 11 illustrates Channel State Information-Reference Signal (CSI-RS) configuration #0 of downlink CSI-RS configurations defined in a current 3GPP standard specification.

In [Table 1] and [Table 2], (k', l') represents an RE index where k' is a subcarrier index and l' is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI-RS}$ and a subframe offset $\Delta_{CSI-RS}$. [Table 3] lists CSI-RS subframe configurations defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Information about a Zero Power (ZP) CSI-RS is transmitted in a CSI-RS-Config-r10 message configured as illustrated in [Table 4] by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by $I_{CSI-RS}$ illustrated in [Table 3]. zeroTxPowerResourceConfigList-r10 indicates a ZP CSI-RS configuration. The elements of this bitmap indicate the respective configurations written in the columns for four CSI-RS antenna ports in [Table 1] or [Table 2]. That is, the current 3GPP standard defines a ZP CSI-RS only for four CSI-RS antenna ports.

TABLE 4

```
-- ASN1START
CSI-RS-Config-r10 ::=       SEQUENCE {
    csi-RS-r10              CHOICE {
        ...
    }
    zeroTxPowerCSI-RS-r10   CHOICE {
        release                 NULL,
        setup                   SEQUENCE {
            zeroTxPowerResourceConfigList-r10   BIT
                                                STRING (
            zeroTxPowerSubframeConfig-r10       INTEGER
                                                (0..
        }
    }
}
-- ASN1STOP
```

The current 3GPP standard defines modulation orders and cording rates for respective CQI indexes as illustrated in [Table 5].

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

A CQI is calculated based on interference measurement as follows.

A UE needs to measure a Signal to Interference and Noise Ratio (SINR) for CQI calculation. In this case, the UE may measure the reception power (S-measure) of a desired signal in an RS such as a Non-Zero Power (NZP) CSI-RS. For interference power measurement (I-measure or Interference Measurement (IM)), the UE measures the power of an interference signal resulting from eliminating the desired signal from a received signal.

CSI measurement subframe sets $C_{CSI,0}$ and $C_{CSI,1}$ may be configured by higher-layer signaling and the subframes of each subframe set are different from the subframes of the other subframe set. In this case, the UE may perform S-measure in an RS such as a CSI-RS without any specific subframe constraint. However, the UE should calculate CQIs separately for the CSI measurement subframe sets $C_{CSI,0}$ and $C_{CSI,1}$ through separate I-measures in the CSI measurement subframe sets $C_{CSI,0}$ and $C_{CSI,1}$.

Hereinbelow, transmission modes for a DL data channel will be described.

A current 3GPP LTE standard specification, 3GPP TS 36.213 defines DL data channel transmission modes as illustrated in [Table 6] and [Table 7]. A DL data channel transmission mode is indicated to a UE by higher-layer signaling, that is, RRC signaling.

TABLE 6

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |
| Mode 2 | DCI format 1A | Transmit diversity |
| | DCI format 1 | Transmit diversity |
| Mode 3 | DCI format 1A | Transmit diversity |
| | DGI format 2A | Large delay CDD or Transmit diversity |
| Mode 4 | DCI format 1A | Transmit diversity |
| | DCI format 2 | Closed-loop spatial multiplexing or Transmit diversity |

TABLE 6-continued

| Transmission mode | DCI format | Transmission scheme of PDSCH corresponding to PDCCH |
|---|---|---|
| Mode 5 | DCI format 1A | Transmit diversity |
| | DCI format 1D | Multi-user MIMO |
| Mode 6 | DCI format 1A | Transmit diversity |
| | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
| | DCI format 1 | Single-antenna port, port 5 |
| Mode 8 | DCI format 1A | If the number of PBCH antenna ports is one, Single-antenna port, port 0 is used, otherwise Transmit diversity |
| | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity MBSFN subframe: Single-antenna port, port 7 |
| | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFN subframe: Single-antenna port, port 7 |
| | DCI format 2D | Up to 8 layer transmission, ports 7-14 or single-antenna port, port 7 or 8 |

TABLE 7

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |
| Mode 2 | DCI format 1A | Transmit diversity |
| | DCI format 1 | Transmit diversity |
| Mode 3 | DCI format 1A | Transmit diversity |
| | DCI format 2A | Transmit diversity |
| Mode 4 | DCI format 1A | Transmit diversity |
| | DCI format 2 | Transmit diversity |
| Mode 5 | DCI format 1A | Transmit diversity |
| Mode 6 | DCI format 1A | Transmit diversity |
| Mode 7 | DCI format 1A | Single-antenna port, port 5 |
| | DCI format 1 | Single-antenna port, port 5 |
| Mode 8 | DCI format 1A | Single-antenna port, port 7 |
| | DCI format 2B | Single-antenna port, port 7 or 8 |
| Mode 9 | DCI format 1A | Single-antenna port, port 7 |
| | DCI format 2C | Single-antenna port, port 7 or 8, |
| Mode 10 | DCI format 1A | Single-antenna port, port 7 |
| | DCI format 2D | Single-antenna port, port 7 or 8, |

Referring to [Table 6] and [Table 7], the 3GPP LTE standard specification defines DCI formats according to the types of RNTIs by which a PDCCH is masked. Particularly for C-RNTI and SPS C-RNTI, the 3GPP LTE standard specification defines transmission modes and DCI formats corresponding to the transmission modes, that is, transmission mode-based DCI formats as illustrated in [Table 6] and [Table 7]. DCI format 1A is additionally defined for application irrespective of transmission modes, that is, for a fall-back mode. [Table 6] illustrates transmission modes for a case where a PDCCH is masked by a C-RNTI and [Table 7] illustrates transmission modes for a case where a PDCCH is masked by an SPS C-RNTI.

Referring to [Table 6], if a UE detects DCI format 1B by blind-decoding a PDCCH masked by a C-RNTI, the UE decodes a PDSCH, assuming that the PDSCH has been transmitted in a single layer by closed-loop spatial multiplexing.

In [Table 6] and [Table 7], Mode 10 is a DL data channel transmission mode for CoMP. For example, in [Table 6], if the UE detects DCI format 2D by blind-decoding a PDCCH masked by a C-RNTI, the UE decodes a PDSCH, assuming that the PDSCH has been transmitted through antenna port 7 to antenna port 14, that is, based on DM-RSs by a multi-layer transmission scheme, or assuming that the PDSCH has been transmitted through a single antenna port, DM-RS antenna port 7 or 8.

Now a description will be given of Quasi Co-Location (QCL).

If one antenna port is quasi co-located with another antenna port, this means that a UE may assume that the large-scale properties of a signal received from one of the antenna ports (or a radio channel corresponding to the antenna port) are wholly or partially identical to those of a signal received from the other antenna port (or a radio channel corresponding to the antenna port). The large-scale properties may include Doppler spread, Doppler shift, timing offset-related average delay, delay spread, average gain, etc.

According to the definition of QCL, the UE may not assume that antenna ports that are not quasi co-located with each other have the same large-scaled properties. Therefore, the UE should perform a tracking procedure independently for the respective antenna ports in order to the frequency offsets and timing offsets of the antenna ports.

On the other hand, the UE may perform the following operations regarding quasi co-located antenna ports.

1) The UE may apply the estimates of a radio channel corresponding to a specific antenna port in power-delay profile, delay spread, Doppler spectrum, and Doppler spread to Wiener filter parameters used in channel estimation of a radio channel corresponding another antenna port quasi co-located with the specific antenna port.

2) The UE may acquire time synchronization and frequency synchronization of the specific antenna port to the quasi co-located antenna port.

3) Finally, the UE may calculate the average of Reference Signal Received Power (RSRP) measurements of the quasi co-located antenna ports to be an average gain.

For example, it is assumed that upon receipt of DM-RS-based DL data channel scheduling information, for example, DCI format 2C on a PDCCH (or an Enhanced PDCCH (E-PDCCH)), the UE performs channel estimation on a PDSCH using a DM-RS sequence indicated by the scheduling information and then demodulates data.

In this case, if an antenna port configured for a DM-RS used in DL data channel estimation is quasi co-located with an antenna port for an antenna port configured for a CRS of a serving cell, the UE may use estimated large-scale properties of a radio channel corresponding to the CRS antenna port in channel estimation of a radio channel corresponding to the DM-RS antenna port, thereby increasing the reception performance of the DM-RS-based DL data channel.

Likewise, if the DM-RS antenna port for DL data channel estimation is quasi co-located with the CSI-RS antenna port of the serving cell, the UE may use estimated large-scale properties of the radio channel corresponding to the CSI-RS antenna port in channel estimation of the radio channel corresponding to the DM-RS antenna port, thereby increasing the reception performance of the DM-RS-based DL data channel.

In LTE, it is regulated that when a DL signal is transmitted in Mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with respect to large-scale properties except average gain. This means that the same node transmits a physical channel and signals. On the other hand, QCL type B is defined such that up to four QCL modes are configured for each UE by a higher-layer message to enable CoMP transmission such as DPS or JT and a QCL mode to be used for DL signal transmission is indicated to the UE dynamically by DCI.

DPS transmission in the case of QCL type B will be described in greater detail.

If node #1 having N1 antenna ports transmits CSI-RS resource #1 and node #2 having N2 antenna ports transmits CSI-RS resource #2, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within the common overage of node #1 and node #2 by a higher-layer signal.

Then, the eNB may perform DPS by configuring QCL mode parameter set #1 for the UE when transmitting data (i.e. a PDSCH) to the UE through node #1 and QCL mode parameter set #2 for the UE when transmitting data to the UE through node #2 by DCI. If QCL mode parameter set #1 is configured for the UE, the UE may assume that CSI-RS resource #1 is quasi co-located with a DM-RS and if QCL mode parameter set #2 is configured for the UE, the UE may assume that CSI-RS resource #2 is quasi co-located with the DM-RS.

An Active Antenna System (AAS) and Three-Dimensional (3D) beamforming will be described below.

In a legacy cellular system, an eNB reduces ICI and increases the throughput of UEs within a cell, for example, SINRs at the UEs by mechanical tilting or electrical tilting, which will be described below in greater detail.

Figure 12:
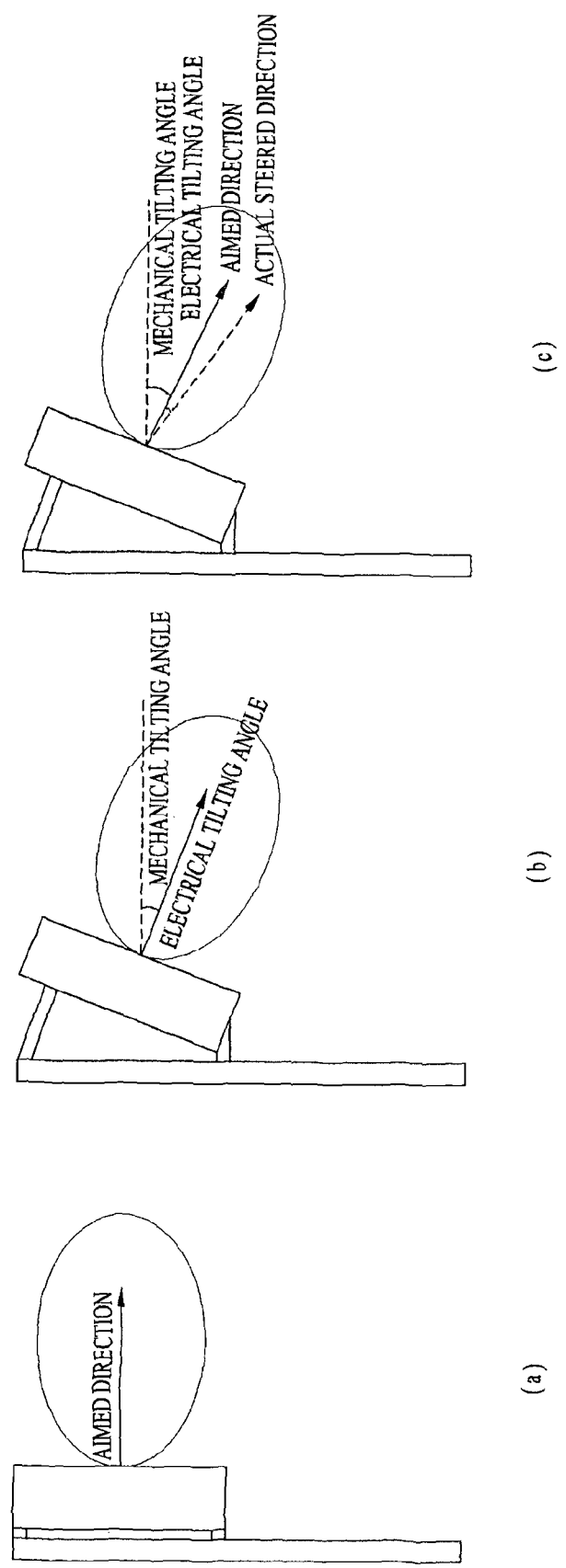
FIG. 12 illustrates antenna tilting schemes.

FIG. 12 illustrates antenna tilting schemes. Specifically, FIG. 12(a) illustrates an antenna configuration to which antenna tilting is not applied, FIG. 12(b) illustrates an antenna configuration to which mechanical tilting is applied, and FIG. 12(c) illustrates an antenna configuration to which both mechanical tilting and electrical titling are applied.

A comparison between FIGS. 12(a) and 12(b) reveals that mechanical tilting suffers from a fixed beam direction at initial antenna installation as illustrated in FIG. 12(b). On the other hand, electrical tilting allows only a very restrictive vertical beamforming due to cell-fixed tilting, despite the advantage of a tilting angle changeable through an internal phase shifter as illustrated in FIG. 12(c).

Figure 13:
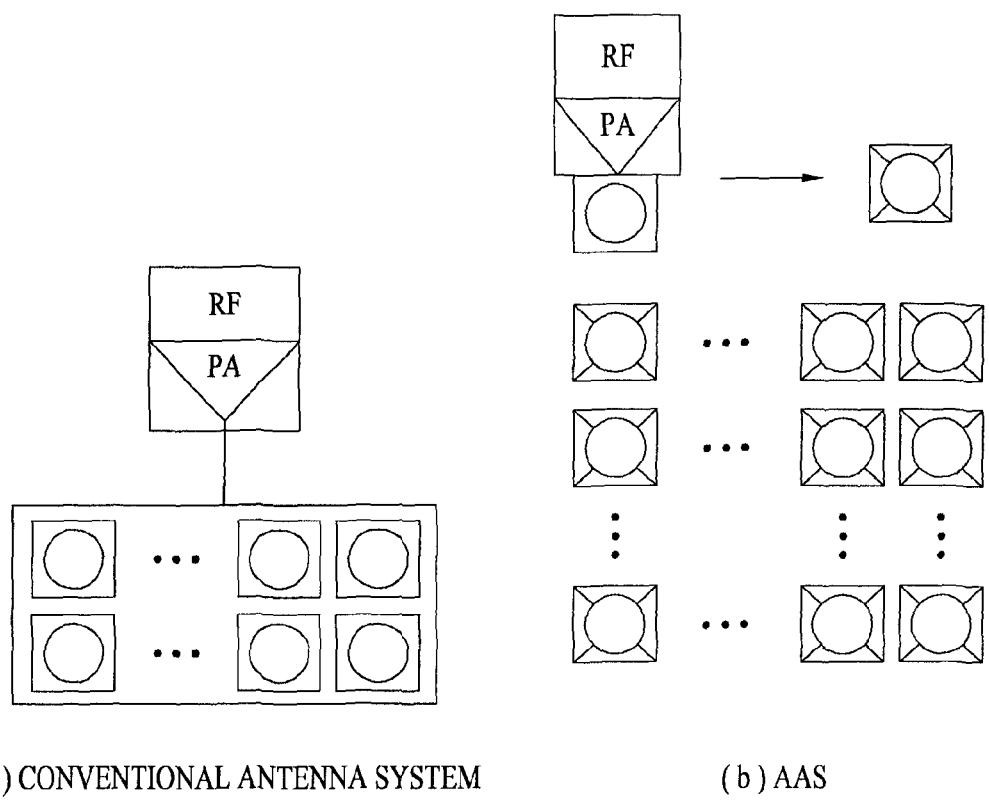
FIG. 13 is a view comparing an antenna system of the related art with an Active Antenna System (AAS)

FIG. 13 is a view comparing an antenna system of the related art with an AAS. Specifically, FIG. 13(a) illustrates the antenna system of the related art and FIG. 13(b) illustrates the AAS.

Referring to FIG. 13, as compared to the antenna system of the related art, each of a plurality of antenna modules includes a Radio Frequency (RF) module such as a Power Amplifier (PA), that is, an active device in the AAS. Thus, the AAS may control the power and phase on an antenna module basis.

In general, a linear array antenna (i.e. a one-dimensional array antenna) such as a ULA is considered as a MIMO antenna structure. A beam that may be formed by the one-dimensional array antenna exists on a Two-Dimensional (2D) plane. The same thing applies to a Passive Antenna System (PAS)-based MIMO structure. Although a PAS-based eNB has vertical antennas and horizontal antennas, the vertical antennas may not form a beam in a vertical direction and may allow only the afore-described mechanical tilting because the vertical antennas are in one RF module.

However, as the antenna structure of an eNB has evolved to an AAS, RF modules are configured independently even for vertical antennas. Consequently, vertical beamforming as well as horizontal beamforming is possible. This is called elevation beamforming.

The elevation beamforming may also be referred to as 3D beamforming in that available beams may be formed in a 3D space along the vertical and horizontal directions. That is, the evolution of a one-dimensional array antenna structure to a 2D array antenna structure enables 3D beamforming. 3D beamforming is not possible only when an antenna array is planar. Rather, 3D beamforming is possible even in a ring-shaped 3D array structure. A feature of 3D beamforming lies in that a MIMO process takes place in a 3D space in view of various antenna layouts other than existing one-dimensional antenna structures.

Figure 14:
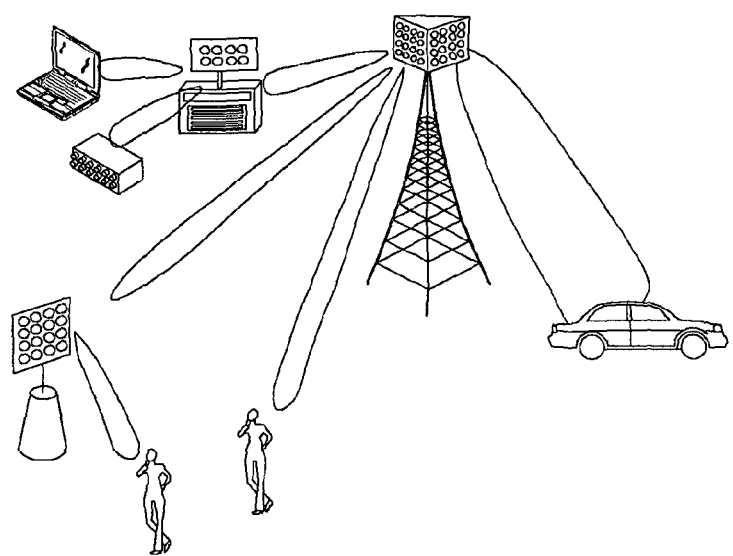
FIG. 14 illustrates an exemplary AAS-based User Equipment (UE)-specific beamforming.

FIG. 14 illustrates an exemplary UE-specific beamforming in an AAS. Referring to FIG. 14, even though a UE moves forward or backward from an eNB as well as to the left and right of the eNB, a beam may be formed toward the UE by 3D beamforming. Therefore, higher freedom is given to UE-specific beamforming.

Further, an outdoor to outdoor environment where an outdoor eNB transmits a signal to an outdoor UE, an Outdoor to Indoor (O2I) environment where an outdoor eNB transmits a signal to an indoor UE, and an indoor to indoor environment (an indoor hotspot) where an indoor eNB transmits a signal to an indoor UE may be considered as transmission environments using an AAS-based 2D array antenna structure.

Figure 15:
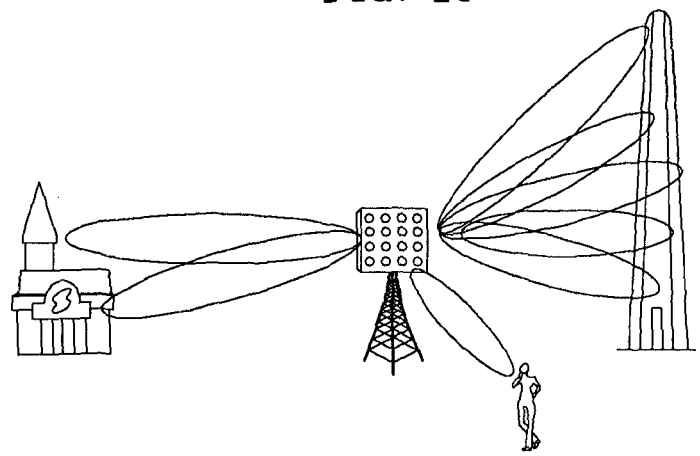
FIG. 15 illustrates an AAS-based two-dimensional beam transmission scenario.

FIG. 15 illustrates an AAS-based 2D beam transmission scenario.

Referring to FIG. 15, an eNB needs to consider vertical beam steering based on various UE heights in relation to building heights as well as UE-specific horizontal beam steering in a real cell environment where there are multiple buildings in a cell. Considering this cell environment, very different channel characteristics from those of an existing wireless channel environment, for example, shadowing/path loss changes according to different heights, varying fading characteristics, etc. need to be reflected.

In other words, 3D beamforming is an evolution of horizontal-only beamforming based on an existing linear one-dimensional array antenna structure. 3D beamforming refers to a MIMO processing scheme performed by extending to or combining with elevation beamforming or vertical beamforming using a multi-dimensional array antenna structure such as a planar array.

Now a description will be given of a MIMO system using linear precoding. A DL MIMO system may be modeled as [Equation 11] in frequency units (e.g. subcarriers) that are assumed to experience flat fading in the frequency domain in a narrow band system or a wideband system.

$$y = Hx + z \qquad \text{[Equation 11]}$$

If the number of Rx antenna ports at a UE is $N_r$ and the number of Tx antenna ports at an eNB is $N_t$, y is an $N_r \times 1$ signal vector received at the $N_r$ Rx antennas of the UE, H is a MIMO channel matrix of size $N_r \times N_t$, x is $N_t \times 1$ transmission signals, and z is an $N_r \times 1$ received noise and interference vector in [Equation 11].

The above system model is applicable to a multi-user MIMO scenario as well as a single-user MIMO scenario. While $N_r$ is the number of Rx antennas at the single UE in the single-user MIMO scenario, $N_r$ may be interpreted as the total number of Rx antennas at multiple UEs in the multi-user MIMO scenario.

The above system model is applicable to a UL transmission scenario as well as a DL transmission scenario. Then, $N_t$ may represent the number of Tx antennas at the UE and $N_r$ may represent the number of Rx antennas at the eNB.

In the case of a linear MIMO precoder, the MIMO precoder may be generally represented as a matrix U of size $N_t \times N_s$ where $N_s$ is a transmission rank or the number of transmission layers. Accordingly, the transmission signal vector x may be modeled as [Equation 12].

$$x = \sqrt{\frac{P_T}{N_s}} Us \qquad \text{[Equation 12]}$$

where $P_T$ is transmission signal energy and s is an $N_s \times 1$ transmission signal vector representing signals transmitted in $N_s$ transmission layers. That is, $E\{s^H U^H Us\}=N_s$. Let $N_t \times 1$ precoding vectors corresponding to the $N_s$ transmission layers be denoted by $u_1, \ldots, u_{Ns}$. Then, $U=[u_1 \ldots u_{Ns}]$. In this case, [Equation 12] may be expressed as [Equation 13].

$$x = \sqrt{\frac{P_T}{N_s}} \sum_{i=1}^{N_s} u_i s_i \qquad \text{[Equation 13]}$$

where $s_i$ is an $i^{th}$ element of the vector s. Generally, it may be assumed that signals transmitted in different layers are uncorrelated ($E\{s_j^* s_i\}=0 \forall i \neq j$) and the average magnitude of each signal is the same. If it is assumed that the average energy of each signal is 1 ($E\{|s_i|^2\}=1 \forall i$), for the convenience of description, the sum of the energy of the layer precoding vectors is $N_s$ given as [Equation 14].

$$\sum_{i=1}^{N_s} E\{u_i^H u_i\} = N_s \qquad \text{[Equation 14]}$$

If a signal is to be transmitted with the same power in each layer, it is noted from [Equation 14] that $E\{u_i^H u_i\}=1$.

As a future multi-antenna system such as massive MIMO or large-scale MIMO evolves, the number of antennas will increase gradually. In fact, use of up to 64~80 Tx antennas are considered for an eNB and 3D channel model is designed in the LTE standard, taking into account a 3D MIMO environment. The massive antenna array may have one or more of the following characteristics. 1) The array of antennas is allocated on a 2 dimensional plane or on a 3 dimensional space. 2) The number of logical or physical antennas is greater than 8. (An antenna port may refers to a logical antenna). 3) More than one antenna includes active components, i.e. active antenna(s). But, the definition of the massive antenna array does not limited the above-mentioned 1)~3).

However, as the number of antennas increases, pilot overhead and feedback overhead also increase. As a result, decoding complexity may be increased. Since the size of the MIMO channel matrix H increases with the number of antennas at an eNB, the eNB should transmit more measurement pilots to a UE so that the UE may estimate the MIMO channels. If the UE feeds back explicit or implicit information about the measured MIMO channels to the eNB, the amount of feedback information will increase as the channel matrix gets larger. Particularly when a codebook-based PMI feedback is transmitted as in the LTE system, the increase of antennas in number leads to an exponential increase in the size of a PMI codebook. Consequently, the computation complexity of the eNB and the UE is increased.

In this environment, system complexity and overhead may be mitigated by partitioning total Tx antennas and thus transmitting a pilot signal or a feedback on a sub-array basis. Especially from the perspective of the LTE standard, a large-scale MIMO system may be supported by reusing most of the conventional pilot signal, MIMO precoding scheme, and/or feedback scheme that support up to 8 Tx antennas.

From this viewpoint, if each layer precoding vector of the above MIMO system model is partitioned into M sub-precoding vectors and the sub-precoding vectors of a precoding vector for an $i^{th}$ layer are denoted by $u_{i,1}, \ldots, u_{i,M}$, the precoding vector for the $i^{th}$ layer may be represented as $u_i = [u_{i,1}^T \ u_{i,2}^T \ \ldots \ u_{i,M}^T]^T$.

Each sub-precoding vector experiences, as effective channels, a sub-channel matrix including Tx antennas in a partition corresponding to the sub-precoding vector, obtained by dividing the $N_r \times N_t$ MIMO channel matrix H by rows. The MIMO channel matrix H is expressed using the sub-channel matrices, as follows.

$$H = [H_1 \ \ldots \ H_M] \qquad \text{[Equation 15]}$$

If the UE determines each preferred sub-precoding vector based on a PMI codebook, an operation for normalizing each sub-precoding vector is needed. Normalization refers to an overall operation for processing the value, size, and/or phase of a precoding vector or a specific element of the precoding vector in such a manner that sub-precoding vectors of the same size may be selected from a PMI codebook for the same number of Tx antennas.

For example, if the first element of the PMI codebook is 0 or 1, the phase and size of each sub-precoding vector may be normalized with respect to 0 or 1. Hereinbelow, it is assumed that a sub-precoding vector $u_{i,m}$ for an $m^{th}$ partition is normalized with respect to a value of $\alpha_{i,m}$ and the normalized sub-precoding vector or the Normalized Partitioned Precoder (NPP) is $v_{i,m}=u_{i,m}/\alpha_{i,m}$. Therefore, partitioned precoding is modeled as [Equation 16], in consideration of codebook-based precoding.

$$u_i = [\alpha_{i,1} v_{i,1}^T \alpha_{i,2} v_{i,2}^T \ \ldots \ \alpha_{i,M} v_{i,M}^T]^T \qquad \text{[Equation 16]}$$

As noted from [Equation 16], the values of $\alpha_{i,m}$ may be interpreted as values that link the NPPs to each other from the perspective of the whole precoder. Hereinafter, these values will be referred to as linking coefficients. Thus, a precoding method for the total Tx antennas (antenna ports) may be defined by defining NPPs for the partitions of antenna ports and linking coefficients that link the NPPs to one another.

M linking coefficients for the $i^{th}$ layer may be defined as a vector $a_i=[\alpha_{i,1} \ \alpha_{i,2} \ \ldots \ \alpha_{i,M}]^T$. Herein, $a_i$ will be referred to as a 'linking vector'.

While it may be said that the linking vector is composed of M values, the other (M−1) values $b_i$ normalized with respect to the first element of the linking vector may be regarded as the linking vector. That is, the relative differences of the other (M−1) NPPs with respect to the first NPP may be defined as a linking vector as expressed in [Equation 17]. This is because it is assumed in many cases that the first element is already normalized from the perspective of the whole precoding vector $u_i$.

$$\frac{a_i}{\alpha_{i,1}} = \left[1 \; \frac{\alpha_{i,2}}{\alpha_{i,1}} \; \frac{\alpha_{i,3}}{\alpha_{i,1}} \; \ldots \; \frac{\alpha_{i,M}}{\alpha_{i,1}}\right]^T = [1 b_i^T]^T \quad \text{[Equation 17]}$$

If each of the transmission layers is divided into the same number of partitions, a linking matrix expressed as [Equation 18] may also be defined. An NPP for each partition in the form of a matrix may be defined as [Equation 19].

$$A = [a_1 \ldots a_{N_s}] \quad \text{[Equation 18]}$$

$$V_m = [v_{1,m} \ldots v_{N_s,m}], m=1, \ldots, M \quad \text{[Equation 19]}$$

Let a vector obtained by repeating each element of an M×1 linking vector as many times as the size of each partition be denoted by an extended linking vector $\hat{a}_i$. For example, if M=2 and the sizes of the first and second partitions are 3 and 4, respectively for an $i^{th}$ layer, $\hat{a}_i = [\alpha_{i,1} \; \alpha_{i,1} \; \alpha_{i,1} \; \alpha_{i,2} \; \alpha_{i,2} \; \alpha_{i,2} \; \alpha_{i,2}]^T$. An extended linking matrix $\hat{A} = [\hat{a}_1 \ldots \hat{a}_{N_s}]$ may be defined by stacking the extended linking vectors.

In this case, the whole precoding matrix may be expressed as a Hadamard product (or element-wise product) between the extended linking matrix and the NPP matrix $V_t$ in [Equation 20].

$$U = \hat{A} \circ V_t \quad \text{[Equation 20]}$$

where $V_t = [V_1^T \ldots V_M^T]^T$ and the matrix operator $\circ$ represents the Hadamard product.

The (extended) linking vectors and the (extended) linking matrix are collectively called a linking precoder. The term precoder is used herein because the (extended) linking vectors and the (extended) linking matrix are elements determining the Tx antenna precoder. As noted from [Equation 20], one linking precoder may be configured, which should not be construed as limiting the present invention. For example, a plurality of sub-linking vectors may be configured by additional partitioning of the linking vector $a_i$ and sub-linking precoders may be defined accordingly. While the following description is given in the context of a single linking precoder, a linking precoder partitioning scenario is not excluded.

While the linking coefficients are represented in such a manner that different linking coefficients are applicable to different transmission layers in the same partition, if each layer is partitioned in the same manner, the linking coefficients may be configured independently of the transmission layers. That is, the same linking coefficients may be configured for every layer. In this case, the relationship that $a_1 \square a_1 = \ldots = a_{N_s}$ is established between the linking vectors. Then the linking precoder may be expressed only with M or (M−1) linking coefficients.

MIMO precoding schemes may be categorized largely into closed-loop precoding and open-loop precoding. When a MIMO precoder is configured, channels between a transmitter and a receiver are considered in the closed-loop precoding scheme. Therefore, additional overhead such as transmission of a feedback signal from a UE or transmission of a pilot signal is required so that the transmitter may estimate MIMO channels. If the channels are accurately estimated, the closed-loop precoding scheme outperforms the open-loop precoding scheme. Thus, the closed-loop precoding scheme is used mainly in a static environment experiencing little channel change between a transmitter and a receiver (e.g. an environment with a low Doppler spread and a low delay spread) because the closed-loop precoding scheme requires channel estimation accuracy. On the other hand, the open-loop precoding scheme outperforms the closed-loop precoding scheme in an environment experiencing a great channel change between a transmitter and a receiver because there is no correlation between the channel change between the transmitter and the receiver and a MIMO precoding scheme.

If a part or all of antenna port partitions are of the same size and corresponding partitioned antenna arrays have similar effective channel characteristics, the same precoding scheme, that is, aligned fractional precoding may be applied to corresponding NPPs.

Figure 16:
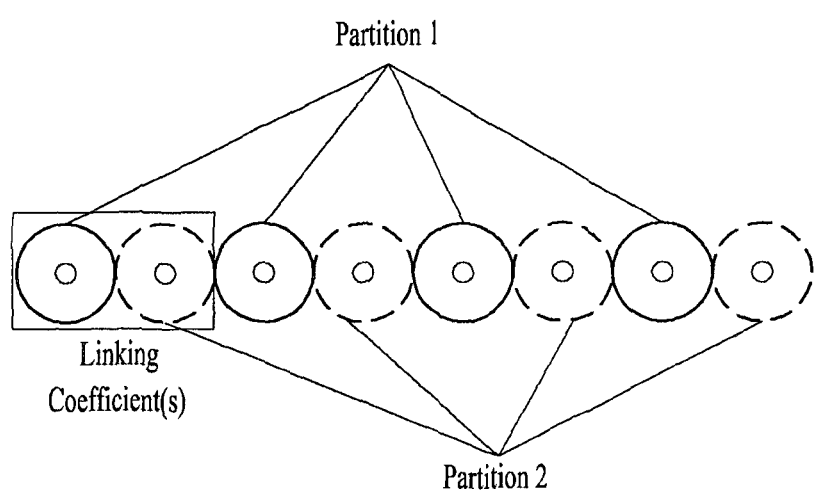
FIG. 16 illustrates an example of applying aligned fractional precoding to a Uniform Linear Array (ULA) according to another embodiment of the present invention.

FIG. 16 illustrates an example of applying aligned fractional precoding to a Uniform Linear Array (ULA) according to another embodiment of the present invention.

Referring to FIG. 16, in a ULA with 8 antennas, a first partition (Partition 1) includes $1^{st}$, $3^{rd}$, $5^{th}$, and $7^{th}$ antennas and a second partition (Partition 2) includes $2^{nd}$, $4^{th}$, $6^{th}$, and $8^{th}$ antennas. If the gap between antennas is narrow and there are not many scatterers around the ULA, Partition 1 and Partition 2 are highly likely to experience similar MIMO channels except for a phase difference between the two partitions, corresponding to a linking precoder component. In this case, the same precoding scheme is set for the two partitions.

Figure 17:
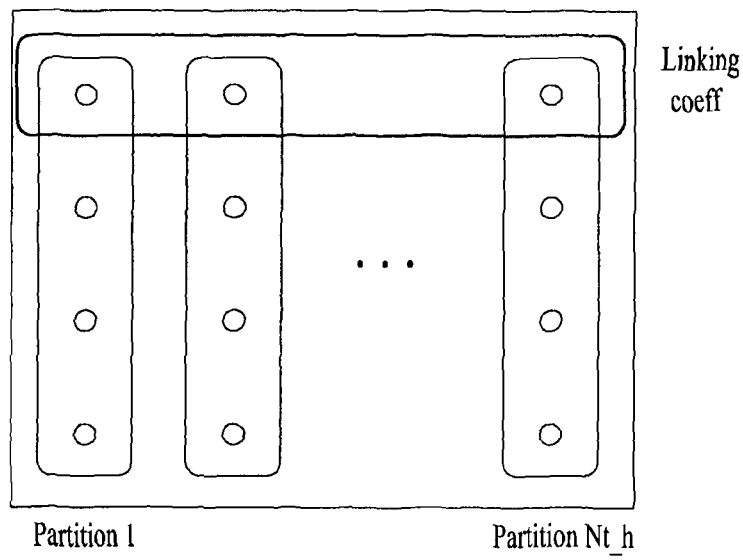
FIG. 17 illustrates an example of applying columnwise aligned fractional precoding to a square array according to another embodiment of the present invention.

FIG. 17 illustrates an example of applying columnwise aligned fractional precoding to a square array according to another embodiment of the present invention.

Referring to FIG. 17, each column is set as one partition in a square array having $N_t(=N_{t\_v} \times N_{t\_h})$ antennas arranged in $N_{t\_v}$ rows and $N_{t\_h}$ columns. If the gap between columns is narrow and $N_{t\_h}$ is not large, the same precoding scheme may be set for all partitions. However, a linking vector is set independently of a sub-precoder.

Figure 18:
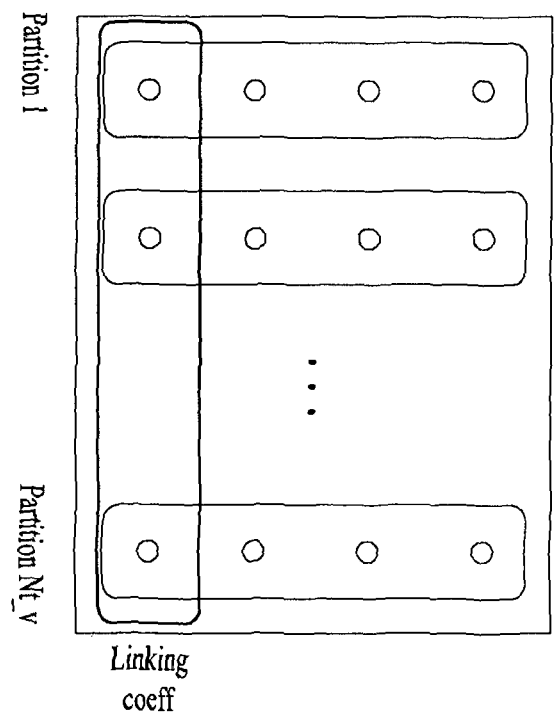
FIG. 18 illustrates an example of applying rowwise aligned fractional precoding to a square array according to another embodiment of the present invention.

FIG. 18 illustrates an example of applying rowwise aligned fractional precoding to a square array according to another embodiment of the present invention.

Referring to FIG. 18, each row is set as one partition in a square array having $N_t(=N_{t\_v} \times N_{t\_h})$ antennas arranged in $N_{t\_v}$ rows and $N_{t\_h}$ columns. If the gap between rows is narrow and $N_{t\_v}$ is not large, the same precoding scheme may be set for all partitions. However, a linking vector is set independently of a sub-precoder.

Figure 19:
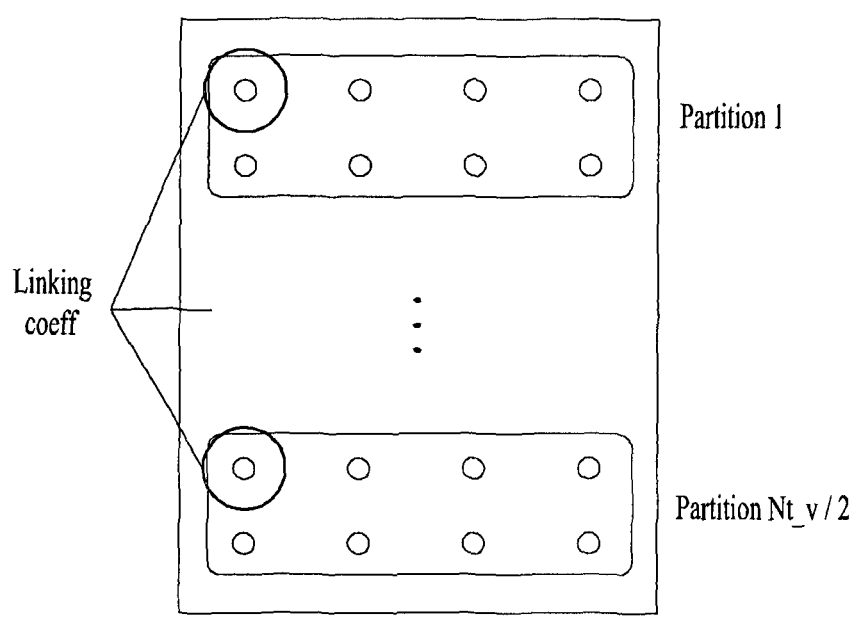
FIG. 19 illustrates an example of applying row groupwise aligned fractional precoding to a square array according to another embodiment of the present invention.

FIG. 19 illustrates an example of applying row groupwise aligned fractional precoding to a square array according to another embodiment of the present invention.

Referring to FIG. 19, each row group including N rows is set as one partition in a square array having $N_t(=N_{t\_v} \times N_{t\_h})$ antennas arranged in $N_{t\_v}$ rows and $N_{t\_h}$ columns. If the gap between row groups is narrow and $N_{t\_v}$ is not large, the same precoding scheme may be set for all partitions. However, a linking vector is set independently of a sub-precoder.

As illustrated in FIGS. 16 to 19, if all partitions are of the same size and the same precoder is applied to the partitions (i.e. $v_i \square v_{i,1} = \ldots = v_{i,M}$), a precoder for an $i^{th}$ layer may be represented as a Kronecker product between a linking precoder and a sub-precoder, given as [Equation 21].

$$u_i = [\alpha_{i,1} v_{i,1}^T \alpha_{i,2} v_{i,2}^T \ldots \alpha_{i,M} v_{i,M}^T]^T = [\alpha_{i,1} v_i^T \alpha_{i,2} v_i^T \ldots \alpha_{i,M} v_i^T]^T = a_i \otimes v_i \quad \text{[Equation 21]}$$

If all transmission layers are partitioned in the same manner, a MIMO precoder for the total layers may be represented as a Khatri-Rao product (a columnwise Kronecker product) between an M×N_s linking matrix A and an $$\frac{N_t}{M} \times N_s$$

sub-precoding matrix V=[v_1 ... v_{N_s}], given as [Equation 22].

$$U=[a_1 \otimes v_1 \ldots a_{N_s} \otimes v_{N_s}]=A*V \quad \text{[Equation 22]}$$

If each column is set as one partition in a Two-Dimensional (2D) antenna port array environment as illustrated in FIG. 17, vertical beamforming (or elevation beamforming) is performed using the sub-precoder $v_i$ or V and horizontal beamforming (or azimuth beamforming) is performed using the linking precoder $a_i$ or A. If each row is set as one partition in a 2D antenna port array environment as illustrated in FIG. 18, horizontal beamforming (or azimuth beamforming) is performed using the sub-precoder $v_i$ or V and vertical beamforming (or elevation beamforming) v is performed using the linking precoder $a_i$ or A.

In the case of perfectly aligned fractional precoding in a row or column direction in a 2D antenna port array environment as illustrated in FIG. 17 or FIG. 18, a precoder that performs 3D beamforming may be expressed as one sub-precoder and one linking precoder. Vertical beamforming is performed using one of the sub-precoder and the linking precoder and horizontal beamforming is performed using the other precoder.

In order to support the above-described closed-loop MIMO precoding, a UE should transmit a pilot or should transmit feedback information in a certain form. In general, since frequency bands for UL and DL are different in an FDD system, a method in which a UE transmits a pilot and a BS estimates a DL channel using channel reciprocity between UL and DL is not appropriate. Therefore, feedback information is generated and transmitted. The feedback information may be classified into explicit information and implicit information, and the implicit information, as a form of Preferred Precoder Index (PPI), may be frequently used in consideration of feedback overhead.

In order to support closed-loop fractional precoding using implicit feedback, PPI information of each sub-precoder and PPI information of a preferred linking precoder may be composed as the feedback information. A PPI feedback scheme for each sub-precoder and linking precoder may be broadly categorized into the following two schemes.

1) A scheme for selecting a precoding vector index preferred by each transmission layer (or stream) from a vector-type codebook ($a_1, \ldots, a_{N_s}$ or $v_{1,m}, \ldots, v_{N_s,m}$) and feeding back the selected index.

2) A scheme for selecting a Precoding Matrix Index (PMI) preferred by all transmission layers (or streams) from a matrix-type codebook (A or $V_m$) and feeding back the selected index.

Comparing the above schemes 1) and 2), in scheme 1), the feedback information may be generated more flexibly and accurately but the amount of feedback information may increase in proportion to the number of transmission layers. If the amount of feedback information varies greatly according to the number of transmission layers, there may be many difficulties in forming a UL channel and transmission format for transmitting feedback. Therefore, most communication systems including LTE transmit PMI-type feedback according to scheme 2).

When PMIs of all or some sub-precoders and linking precoder are fed back, feedback overhead is determined according to the size of a PMI codebook. In an existing system not considering antenna port partitioning, the order of each row or column in a precoding matrix included in the PMI codebook does not have a significant meaning. For example, a PMI codebook $W_1, \ldots, W_C$ including C matrices is used and an $i^{th}$ matrix in the codebook is expressed using a precoding vector for each transmission layer, as follows.

$$W_i=[w_{i,1} \ldots w_{i,N_s}] \quad \text{[Equation 23]}$$

In general, a MIMO precoder is designed to maximize or minimize a predetermined cost function $f\{\Box\}$ given as [Equation 24]. For convenience of description, [Equation 24] shows an example of minimizing the cost function.

$$i^* = \arg\min_i f\{HW_i\} = \arg\min_i f\left\{\sum_{j=1}^{N_s} Hw_{i,j}\right\} \quad \text{[Equation 24]}$$

Here, a permutation matrix $\hat{W}_i$ obtained by changing orders of columns of a matrix $W_i$ is expressed as follows.

$$\hat{W}_i=[w_{i,p(1)} \ldots w_{i,p(N_s)}] \quad \text{[Equation 25]}$$

where $p(1), \ldots, p(N_s)$ denotes arbitrary permutation of integers between 1 and $N_s$. The following correlation may be achieved.

$$\sum_{j=1}^{N_s} Hw_{i,j} = \sum_{j=1}^{N_s} Hw_{i,p(j)} \quad \text{[Equation 26]}$$

Therefore, it is noted that selection of a PMI is not influenced even when the order of a precoding vector for each transmission layer is changed in a precoding matrix. A layer precoding vector may be set as each row of the precoding matrix according to a matrix codebook. However, for convenience, it is assumed that the layer precoding vector is set as each column of the precoding matrix.

As described above, permutation between columns in an existing PMI codebook does not have a significant meaning, thus there is no need to have a precoding matrix obtained by reflecting permutation between columns as an element of the codebook. That is, if the PMI codebook includes $W_i$, $\hat{W}_i$ to which arbitrary permutation is applied is not included in the codebook. This is quite reasonable in consideration of feedback overhead.

Now a description will be given of a case that fractional precoding is applied. When a UE selects PMIs of a sub-precoder $V_m$ (m=1, ... M) for each partition and a linking precoder A, a different optimal precoder is selected according to whether matching between transmission layers of each partition is considered. For example, when M=2, it is assumed that PMI i for Partition 1, PMI j for Partition 2, and PMI k for a linking matrix are selected as follows.

$$\{i^*, j^*, k^*\} = \arg\max_{\{i,j,k\}} f\{HU_{i,j,k}\} \quad \text{[Equation 27]}$$

If each layer is partitioned in the same manner, an optimal PMI set {i, j, k} may be found using a correlation of $U=\hat{A} \circ V_i$. In the above example when M=2, since $V_i=[V_1^T V_2^T]^T$, PMI i may be a PMI corresponding to $V_1$, PMI j may be a PMI corresponding to $V_2$, and PMI k may be a PMI corresponding to A.

If each PMI codebook does not allow permutation between columns which is allowed by the existing codebook, an optimal precoding matrix may not be formed easily from the perspective of the whole precoder. For example, when M=2 and $N_s$=2, it is assumed that an optimal precoder is formed as $V_1^*$=[$v_{1,1}$ $v_{2,1}$], $V_2^*$=[$v_{1,2}$ $v_{2,2}$], and $$A^* = \begin{bmatrix} \alpha_{1,1} & \alpha_{2,1} \\ \alpha_{1,2} & \alpha_{2,2} \end{bmatrix}.$$

If the codebook for Partition 2 includes only the matrix [$v_{2,2}$ $v_{1,2}$] and does not include the matrix [$v_{1,2}$ $v_{2,2}$], the precoder may not be optimized. Likewise, if the codebook for the linking matrix includes the matrix $$\begin{bmatrix} \alpha_{2,1} & \alpha_{1,1} \\ \alpha_{2,2} & \alpha_{1,2} \end{bmatrix}$$

or the matrix $$\begin{bmatrix} \alpha_{1,2} & \alpha_{2,2} \\ \alpha_{1,1} & \alpha_{2,1} \end{bmatrix}$$

and does not include A*, the precoder may not be optimized.

In order to solve the above problem, for optimization of performance when multiple partitioned layers are precoded, the present invention proposes the following schemes.

Embodiment 1

In a partitioned multilayer precoding environment, a PMI codebook for sub-precoders and/or a linking precoder includes permutation between columns or rows of a precoding matrix.

Specifically, when a PMI codebook for sub-precoders and/or a linking precoder includes a certain matrix W, a matrix $\hat{W}$ obtained by reflecting permutation between specific columns or rows of the matrix W is also included in the same codebook. This scheme may optimize performance of precoding but may increase feedback overhead due to increase in size of the PMI codebook.

Embodiment 2

In a partitioned multilayer precoding environment, layer matching information of at least one of each sub-precoder and a linking precoder is fed back. That is, a UE calculates PMIs of a part of or all sub-precoders and/or a linking precoder by performing permutation between columns (or rows) of a matrix in a PMI codebook, and feeds back permutation information to a BS.

Examples of the layer matching information include, i) alignment (or permutation) information of columns or rows of a precoding matrix, or layer precoders, and ii) matching information between columns or rows of a plurality of precoding matrices, or between layer precoders.

Particularly, i) the alignment information of columns or rows of a precoding matrix, or layer precoders collectively refers to information indicating the orders of rows or columns of the precoding matrix, or the orders of layer precoder indices. For example, if a PMI of an $m^{th}$ (m>1) sub-precoder based on a first sub-precoder is selected from a PMI code-book $W_1, \ldots, W_C$ including C matrices, an $i^{th}$ matrix in the codebook is formed as [Equation 23] above. This permutation is expressed using two-line notation as follows.

$$\begin{pmatrix} 1 & 2 & \ldots & N_s \\ p(1) & p(2) & \ldots & p(N_s) \end{pmatrix} \quad \text{[Equation 28]}$$

In this case, in order to find an optimal $m^{th}$ sub-precoder, a UE compares all matrices in the PMI codebook and their arbitrary permutations. In addition to a PMI (for example, index i) of the optimal precoding matrix found by the UE, an optimal permutation $p(1), \ldots, p(N_s)$ of the PMI is also fed back.

Optimal alignment (permutation) information may be formed in various ways. For example, the values $p(1), \ldots, p(N_s)$ may be sequentially transmitted. Alternatively, information about only a group of indices whose orders are switched compared to a reference order, for example, order from 1 to $N_s$, may be selectively transmitted. Otherwise, vectors or matrix indices capable of representing the values $p(1), \ldots, p(N_s)$ may be transmitted. Specifically, a permutation matrix P may be defined as follows.

$$P = \begin{bmatrix} e_{p(1)} \\ \vdots \\ e_{p(Ns)} \end{bmatrix} \quad \text{[Equation 29]}$$

where $e_i$ is a 1×$N_s$ row vector whose $i^{th}$ element is 1 and other elements are 0. A correlation of $\hat{W}_i = W_i P$ is achieved. Therefore, the UE may find the optimal permutation matrix of the layer permutation matrix P in the codebook and may transmit corresponding index information as feedback information.

In the case of ii) the matching information between columns or rows of a plurality of precoding matrices, or between layer precoders, information about matching layers between different sub-precoders and linking precoders may be fed back. For example, a first layer of a first sub-precoder is linked to an $i(m)^{th}$ layer of an $m^{th}$ (m>1) sub-precoder, the value i(m) may be fed back. That is, values i(2), i(3), ..., i(M), and j may be fed back according to the order of partitions. Here, j refers to layer matching information of the linking precoder.

Embodiment 3

Now a description will be given of a case that normalized sub-precoders are equally configured, that is, perfectly aligned fractional precoding. As described above, a precoder for all Tx antennas is represented as a Kronecker product between an aligned sub-precoder and a linking precoder. Therefore, if the above-described second embodiment is applied to this case, layer matching information between the aligned sub-precoder and the linking precoder should be fed back. Accordingly, transmission of the layer matching information between the aligned sub-precoder and the linking precoder needs to be considered in a partitioned multilayer precoding environment.

Specifically, the layer matching information includes at least one of matching information between columns (or rows) of precoding matrices of the aligned sub-precoder and the linking precoder and alignment information of columns (or rows) of one of two precoding matrices based on the other matrix. The difference from the first embodiment and the second embodiment lies in that layer matching is performed with respect to one sub-precoder and one linking precoder.

Each of the PMIs of the aligned sub-precoder and the linking precoder is not always represented as one index. For example, the LTE system specifies that, if a BS transmits a signal using a total of 8 Tx antenna ports, a UE feeds back two PMIs. Therefore, if the aligned sub-precoder or the linking precoder is defined with respect to 8 or more Tx antenna ports, two or more PMIs may be used to represent a preference index of the aligned sub-precoder or the linking precoder.

Embodiment 4

When the above-described third embodiment is applied to the 2D antenna array environment described above in relation to FIGS. 16 to 18, if perfectly aligned fractional precoding is performed in a row or column direction in the 2D antenna port array environment, a precoder for 3D beamforming may include one sub-precoder and one linking precoder, and one of the two precoders is used for vertical beamforming while the other is used for horizontal beamforming.

Therefore, if the present invention is applied to a multilayer 3D beamforming environment, layer matching information between a PMI for vertical beamforming (hereinafter referred to as V-PMI) and a PMI for horizontal beamforming (hereinafter referred to as H-PMI) is fed back.

Here, the layer matching information includes at least one of matching information between columns (or rows) of precoding matrices of the V-PMI and H-PMI and alignment information of columns (or rows) of one of two matrices corresponding to the two PMIs based on the other matrix. The difference from the first embodiment and the second embodiment lies in that layer matching is performed with respect to one V-PMI and one H-PMI.

Each of the V-PMI and H-PMI is not always represented as one index. For example, the LTE system specifies that, if a BS transmits a signal using a total of 8 Tx antenna ports, a UE feeds back two PMIs. Therefore, if the V-PMI or H-PMI is defined with respect to 8 or more Tx antenna ports, two or more PMIs may be used to represent the V-PMI or H-PMI.

A precoder used for 3D beamforming should be designed in such a manner that a transmitter concentrates transmission energy in an optimal direction in 3D space and thus energy of a signal is concentrated at a receiver. Now a description will be given of the above operation with respect to the V-PMI and H-PMI with reference to FIG. 20.

Figure 20:
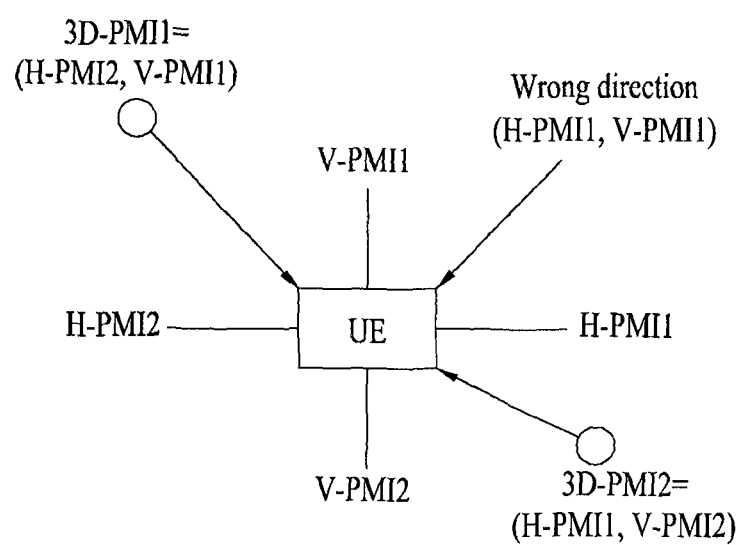
FIG. 20 illustrates Precoding Matrix Indices (PMIs) of each layer to be necessarily transmitted for 3D beamforming according to an embodiment of the present invention.

FIG. 20 illustrates PMIs of each layer to be necessarily transmitted for 3D beamforming, according to an embodiment of the present invention. In FIG. 20, the PMIs of each layer to be necessarily transmitted for 3D beamforming are denoted by 3D-PMIx, and x denotes a layer index. For convenience of description, rank 2 transmission is assumed.

Referring to FIG. 20, 3D-PMIx is dependent on a 3D wireless environment, for example, scatterers and reflectors around a UE and BS. Therefore, if the UE feeds back only V-PMIx and H-PMIx, optimal 3D-PMIx may not be represented as illustrated in FIG. 20. Alternatively, if the UE calculates the V-PMIx and H-PMIx by transferring a received signal to each of a horizontal domain and vertical domain, a pair of V-PMI and H-PMI in a direction completely different from that of the optimal 3D-PMIx with respect to the UE may be calculated as illustrated in FIG. 20.

Consequently, if matching information between V-PMI1 and V-PMI2, and H-PMI1 and H-PMI2 for each transmission layer is not transferred to the BS, the BS may concentrate energy in a completely different direction and thus may cause a transmission error as illustrated in FIG. 20. An effect of preventing this transmission error may be achieved according to the present invention.

If feedback of layer matching information according to the present invention is applied to a wideband system, one piece of layer matching information about a whole bandwidth, or a plurality of pieces of layer matching information about divided specific frequency areas such as subbands, subcarriers, or resource blocks may be fed back. Alternatively, layer matching information about only a specific frequency area selected by the UE or designated by the BS may be fed back. The frequency area may include one or more frequency-continuous areas or frequency-discontinuous areas.

The layer matching information according to the present invention may be fed back as a physical layer signal or a higher layer signal. A time and cycle when the UE feeds back the layer matching information may differ from the time and cycle when the PMIs are fed back. The UE may be configured to transmit the layer matching information cyclically or non-cyclically according to a request of the BS. Alternatively, the UE may be configured to voluntarily feed back the layer matching information as necessary.

Otherwise, the UE may be configured to feed back the layer matching information only if a specific condition is satisfied. For example, the UE may be configured to feed back the layer matching information only if the transmit rank is 2 or above. Alternatively, the UE may be configured to feed back the layer matching information only if layer matching preferred by the UE is different from reference layer matching. Here, an example of the reference layer matching may be $p(i)=i$ ($i=1, \ldots, N_s$) if matching is performed in the order of columns (or rows) of a precoding matrix.

Further, the layer matching information of the present invention can be generated by limiting a part of layer matching relations among all possible matching relations from the perspective of the overhead. Furthermore, when limiting the matching relations, it can be considered parameters such as a number of layers ($N_s$), a number of total transmission antennas, a number of transmission antennas of a sub-precoder or a system bandwidth (or a number of subbands), since a number of bits which can be transmitted as feedback information may be limited.

For example, if the layer matching information should be generated within N bits regardless of the number of layers, the possible layer matching relations have to be limited to the part of the total layer matching relations when the total number of layer matching relations is increased.

For another example, a size of the layer matching information can be designed inversely proportional to the number of layers, by considering a gain over a total feedback overhead. In this case, the layer matching information is reported as the feedback information when a lower rank, but when a higher rank, the layer matching information is not reported. That is, when the higher rank, the reference layer matching information can be used. In comparison to the PMI codebook extension scheme according to the first embodiment, the layer matching information feedback method according to the second to fourth embodiments may more easily control feedback overhead and may achieve a smaller PMI codebook.

Figure 21:
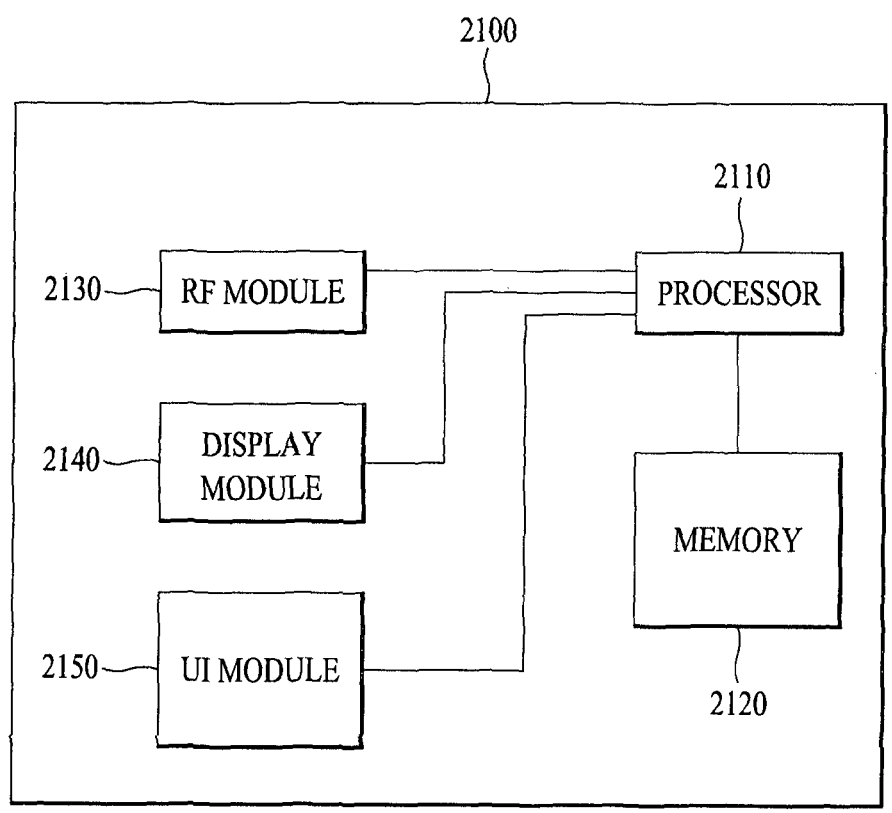
FIG. 21 is a block diagram of a communication apparatus according to an embodiment of the present invention.

FIG. 21 is a block diagram of a communication apparatus according to an embodiment of the present invention.

Referring to FIG. 21, a communication apparatus 2100 includes a processor 2110, a memory 2120, an RF module 2130, a display module 2140, and a User Interface (UI) module 2150.

The communication device 2100 is shown as having the configuration illustrated in FIG. 21, for the convenience of description. Some modules may be added to or omitted from the communication apparatus 2100. In addition, a module of the communication apparatus 2100 may be divided into more modules. The processor 2110 is configured to perform operations according to the embodiments of the present invention described before with reference to the drawings. Specifically, for detailed operations of the processor 2110, the descriptions of FIGS. 1 to 20 may be referred to.

The memory 2120 is connected to the processor 2110 and stores an Operating System (OS), applications, program codes, data, etc. The RF module 2130, which is connected to the processor 2110, upconverts a baseband signal to an RF signal or downconverts an RF signal to a baseband signal. For this purpose, the RF module 2130 performs digital-to-analog conversion, amplification, filtering, and frequency upconversion or performs these processes reversely. The display module 2140 is connected to the processor 2110 and displays various types of information. The display module 2140 may be configured as, not limited to, a known component such as a Liquid Crystal Display (LCD), a Light Emitting Diode (LED) display, and an Organic Light Emitting Diode (OLED) display. The UI module 2150 is connected to the processor 2110 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

INDUSTRIAL APPLICABILITY

A layer alignment method and apparatus for multilayer Three-Dimensional (3D) beamforming in a wireless communication system has been described above as being applied to a 3rd Generation Partnership Project Long Term Evolution (3GPP LTE) system, but is also applicable to various wireless communication systems other than the 3GPP LTE system. Further, the present invention is related to the massive antenna array, but is applicable to any antenna array structures.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method for transmitting feedback information for fractional beamforming using a massive antenna array from a User Equipment (UE) to a Base Station (BS) in a wireless communication system, the method comprising:
   receiving information about a plurality of Reference Signal (RS) resources from the BS;
   selecting a sub-precoder for one RS resource among the plurality of RS resources and a linking precoder for linking the plurality of RS resources, based on a preset codebook; and
   reporting information about the selected sub-precoder and the selected linking precoder to the BS,
   wherein the selected sub-precoder is one precoding matrix of precoding matrices comprised in the codebook or a permuted form of the one precoding matrix, and
   wherein the information about the selected sub-precoder comprises an index and permutation information of the one precoding matrix.

2. The method of claim 1, wherein, if the RS resources respectively correspond to columns of the massive antenna array, the sub-precoder is used for vertical beamforming and the linking precoder is used for horizontal beamforming.

3. The method of claim 1, wherein, if the RS resources respectively correspond to rows of the massive antenna array, the sub-precoder is used for horizontal beamforming and the linking precoder is used for vertical beamforming.

4. The method of claim 1, wherein the permutation information is permutation matrix information for defining a precoding matrix permuted from the one precoding matrix.

5. The method of claim 1, wherein the information about the selected sub-precoder comprises matching information between the sub-precoder and the linking precoder.

6. The method of claim 1, wherein the massive antenna array is partitioned in units of rows or columns, and
   wherein the RS resources correspond to the partitions.

7. A reception apparatus in a wireless communication system, the reception apparatus comprising:
- a transceiver configured to receive information about a plurality of Reference Signal (RS) resources from a transmission apparatus for fractional beamforming using a massive antenna array, and reporting information about a selected sub-precoder and a selected linking precoder to the transmission apparatus using the RS resources; and
- a processor configured to select a sub-precoder for one RS resource among the plurality of RS resources, and a linking precoder for linking the plurality of RS resources, based on a preset codebook,
- wherein the selected sub-precoder is one precoding matrix of precoding matrices comprised in the codebook or a permuted form of the one precoding matrix, and
- wherein the information about the selected sub-precoder comprises an index and permutation information of the one precoding matrix.

8. The reception apparatus of claim 7, wherein, if the RS resources respectively correspond to columns of the massive antenna array, the sub-precoder is used for vertical beamforming and the linking precoder is used for horizontal beamforming.

9. The reception apparatus of claim 7, wherein, if the RS resources respectively correspond to rows of the massive antenna array, the sub-precoder is used for horizontal beamforming and the linking precoder is used for vertical beamforming.

10. The reception apparatus of claim 7, wherein the permutation information is permutation matrix information for defining a precoding matrix permuted from the one precoding matrix.

11. The reception apparatus of claim 7, wherein the information about the selected sub-precoder comprises matching information between the sub-precoder and the linking precoder.

12. The reception apparatus of claim 7, wherein the massive antenna array is partitioned in units of rows or columns, and
wherein the RS resources correspond to the partitions.

* * * * *